Jan. 11, 1966   W. HUNTH   3,228,632
CONTROL DEVICE AND MECHANICAL LOCK
Filed July 9, 1963
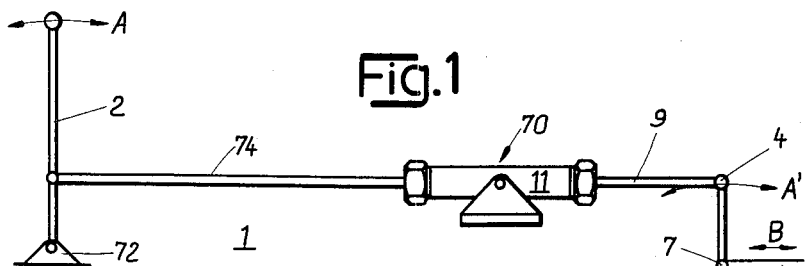
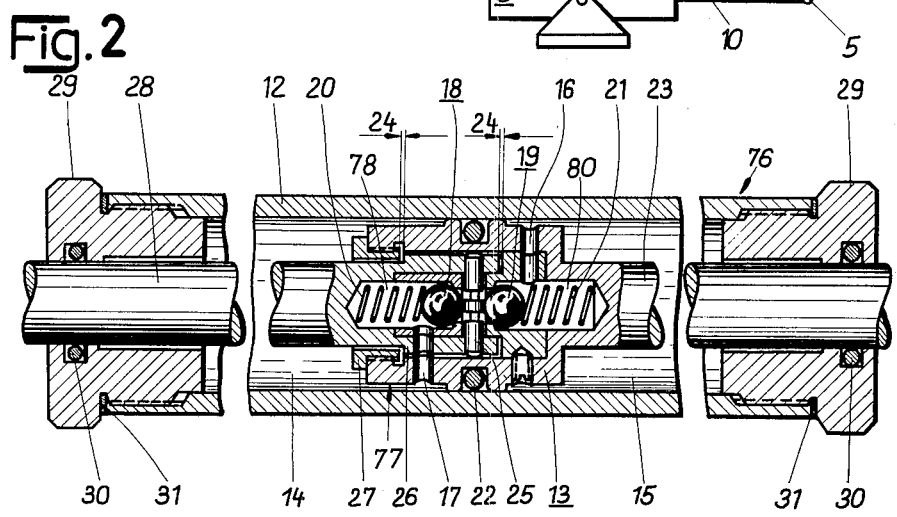
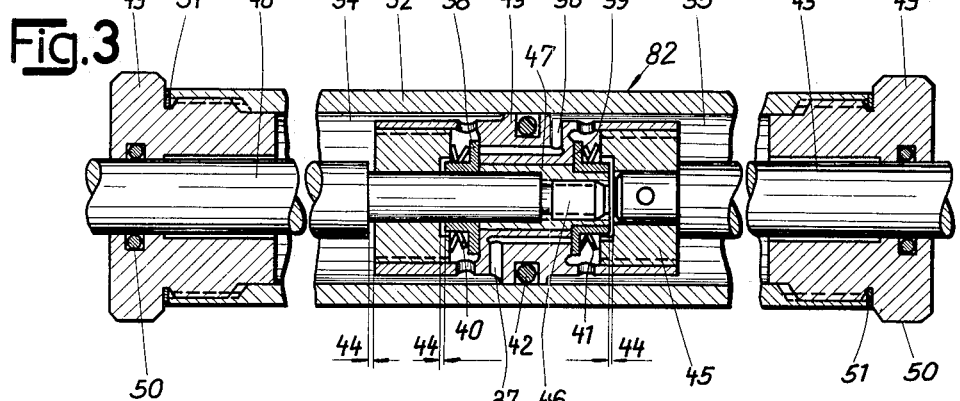
INVENTOR
*Werner Hunth*
By McGlew and Toren
ATTORNEYS

United States Patent Office 3,228,632
Patented Jan. 11, 1966

1

3,228,632
CONTROL DEVICE AND MECHANICAL LOCK
Werner Hunth, Munich, Germany, assignor to Bölkow Gesellschaft mit beschränkter Haftung, Munich, Germany
Filed July 9, 1963, Ser. No. 293,732
Claims priority, application Germany, July 17, 1962, B 68,055
4 Claims. (Cl. 244—83)

This invention relates in general to control systems and to a fluid operated device for transmitting motion in a single direction and for preventing reaction motion in an opposite direction, and in particular to a new and useful mechanical flight control for aircraft wherein a plurality of control sources is arranged to act on a single control element.

The invention has particular application in respect to a system for moving control surfaces of aircraft and particularly to a system in which several control inlets or sources are arranged to operate on a common vane or control element such as a vane of a rudder or drive. A device with which the prevent invention is concerned will have particular application, for example, with respect to a hand control which is arranged to function in conjunction with a superimposed automatic control but remains reaction free, or to a system with a plurality of automatic controls which controls are to act completely independently of one another.

In order to keep a control device which operates in concert with similar control devices on a control element free from the reaction of similar control devices acting on this element, it has been known to provide the control device with a hydraulic transmission system where the movements of the vane are produced by the hydraulic pressure. It is also known in mechanical control devices to prevent a reaction by mechanical or electromechanical locking mechanisms. Known controls of active hydraulic transmissions require considerable expenditure of hydraulic devices, and controls with mechanical or electro-mechanical reaction locks have the disadvantage of complicated design and require additional shifting movements, which movements are different from the control movements in order either to release or to lock the reaction lock.

In accordance with the present invention, there is provided a mechanical flight control system having several separate controls which are arranged to work on a common control element or common vane and wherein one of the controls, there is arranged a hydraulic reaction lock having means permitting an oil bypass when a reaction force of another control is acting. The construction is such that control movements are transmitted by mechanical means and movements of varying amplitude and direction are transmitted from the inlet of the hydraulic reaction lock to the outlet, but forces which act on the outlet and reacting from the vane are not transmitted through the reaction lock from the outlet back to the inlet.

In a further arrangement, a piston provided with bypasses and with valves closing such bypasses is arranged in a hydraulic cylinder which is mounted on the aircraft frame in a position for acting between a control initiative means such as a hand control and a controlled element such as a rudder. A piston rod is articulated on the inlet side of the piston to the hand control. Axial play is provided between the piston rod connection to the piston in a manner such that the valves arranged in the bypasses of the piston can be opened alternatively during axial movement of the piston rod. The axial clearance necessary for controlling the operation of the valves will

2 be so small that the control movements to be transmitted are not materially influenced thereby. The outlet side of the piston rod is secured directly to the piston-forming element at its end. This end is formed so that it extends around the other piston portion formed by the inlet connecting rod. The outlet connecting rod is connected directly to the control element or rudder. Forces reacting from the control element through the outlet piston rod will not be able to move the piston since the latter is locked in the cylinder by a passive oil filling when the valves in the piston are closed.

In one embodiment of the invention, locking is achieved by providing bypasses which form a common passage for the piston in both directions of its movement. Spring biased release valves are arranged in the bypasses and have opposite forward directions of movement. The blocking is eliminated by an axial movement of the piston rod on the inlet side. The inlet piston rod is secured with play on the piston assembly and this play permits opening of one of the valves while the other valve is opened by the oil pressure produced during the movement acting against the force of the relatively weak valve spring.

In another embodiment of the invention, separate but parallel bypasses are provided for opposite directions of movement of the pistons and release valves with relatively strong springs and opposite forward directions are arranged in these respective bypasses. Depending on the layout of the valves and their springs, the reaction from the outlet to the inlet can be blocked. This blocking is released when the force acting on the inlet exceeds a predetermined amount and thus permits a reaction on the inlet. An arrangement of this nature is advantageous when it is necessary that a certain maximum force must not act on the vane. In the preferred arrangement of the invention, the control advantageously includes a hand lever control which is arranged to move a control element such as a vane or rudder by moving one arm of a double-armed lever which in turn is connected to the hand control through a reaction lock. The other arm of the double-armed lever is advantageously influenced by another control. The other control may, for example, be an automatic control. One or more of such automatic controls may be included in the basic system. The arrangement may be such, for example, that one or more hand controls and automatic controls are actuated alternately or simultaneously.

Accordingly, it is an object of this invention to provide an improved control system for permitting a plurality of controls to act on a single control element without the controls being subject to a reaction from the element.

A further object of the invention is to provide a device for controlling a control element such as a rudder which includes hydraulic reaction means connected between at least one of a plurality of controls and the rudder for insuring that the controls so connected will not be subject to reaction from the rudder.

A further object of the invention is to provide a blocking device for transmitting controls from an inlet end to an outlet end with means therein permitting the transmission of a control movement from the inlet to the outlet, but blocking the transmission of a reaction movement from the outlet to the inlet.

A further object of the invention is to provide a blocking device for transmitting control movements which includes a cylinder into which an inlet connecting rod and an outlet connecting rod are extended, with the inlet rod being connected to a piston which is connected to the outlet rod through a piston assembly, with passages being defined between the inlet and outlet sides of the piston assembly, permitting movement of the inlet rod for transmitting movement to the outlet rod but blocking movement from the outlet rod for transmitting motion to the inlet rod.

A further object of the invention is to provide a control system which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a somewhat schematic representation of a mechanical flight control permitting simultaneous or alternating actuation of a hand control with an automatic control construction in accordance with the invention;

FIG. 2 is a partial transverse section of a reaction lock for the system of FIG. 1 and constructed in accordance with the invention;

FIG. 3 is a section similar to FIG. 2 of another embodiment of the invention.

Referring to the drawing in particular the invention embodied therein comprises:

In FIG. 1 a mechanical flight control system generally designated 70 which, in the embodiment indicated, is a control for a rudder or vane 8 with control movement being in the direction of the arrows indicated B. A hand control 2 is mounted on a bracket 72 for pivotal movement in the directions of the arrows A for shifting an inlet control rod 74 and an outlet control rod 9. The outlet control rod 9 is connected at its one end to one end 4 of the double-armed lever 6. The opposite end 5 of the double-armed lever 6 is connected to one end of a control member 10 which is shifted by an automatic control device 3. Actuation of the hand control 2 produces a pivotal movement of the control rod by a corresponding amount as indicated by the arrows A' and effects movement of the vane 8. On this movement can be superimposed another movement represented by the arrows C, which other movement is fed from the automatic control unit 3 through the control element 10. Additional automatic control units of the type indicated at 3 or additional control units, of course, may be incorporated in the system for actuating the vane 8.

In accordance with the invention, between the hand control 2 and the two-armed lever 6 there is arranged a hydraulic reaction lock 11 having passive oil filling which prevents a reaction of the automatic control 3 on the hand control 2. The reaction lock 11 is located between the inlet control arm 74 and the outlet control arm 9. In FIG. 2, there is indicated a reaction lock generally designated 76 of a type similar to the reaction lock 11. The reaction lock 76 comprises a reaction cylinder 12 which is closed by plug elements 29 at each end which have openings for accommodating an inlet piston rod member 28 at one end and an outlet piston rod member 23 at the opposite end corresponding to the piston rod member 74 and 9, respectively, in the embodiment of FIG. 1. The piston rod members are sealed by O-rings 30, 30 in each of the end plugs 29.

The surrounding piston element 13 is formed at one end of the outlet piston rod 23 and at least a portion of its exterior wall is in sealing engagement with the interior wall of the cylinder 12, such as by sealing rings or packing 22. The inlet piston rod 28 has a widened portion or piston element 26 formed at an inner end which is located within the outer piston portion 13. The piston packing 22 prevents an exchange of oil between the compartments 15 and 14 on each side of a piston assembly generally designated 77 which is formed of outer piston portion 13 and inner piston portion 26.

In this embodiment, the piston assembly 77 remains at rest when axial forces act on the piston rod 23 from the outlet side. If an axial force acts on the piston rod 28 from the inlet side, then a pin 25 which is arranged in a cross passage of the piston 26, which is perpendicular to the direction of motion, opens one of two release valves 18 or 19. An oil pressure is produced in the bypasses 16 and 17 which communicate through passages 78 and 80 when respective valves 18 and 19 thereof are opened. This oil pressure causes the opening of the valves 19 or 18 against the force of their respective valve springs 21 or 20.

A small axial play of the piston rod 28 on the inlet side is necessary in order to permit the valves 18 and 19 to open. This play is small compared to the control movement to be effected and therefore has no harmful effect. The play 24 is adjustable by means of an inverted sleeve 27 which is screwed into the interior end of the exterior piston 13. Apart from the control movements set by the hand control 2 there are no additional shifting movements necessary for releasing and locking the reaction locks 70 or 76.

In FIG. 3 another embodiment of a reaction lock generally designated 82 is indicated which comprises a hydraulic cylinder 32 which is sealed at opposite ends by plugs 49 which permit sliding movement of an inlet piston rod 48 and an outlet piston rod 43 which are sealed via sealing rings or packing 50, 50. Piston 43 is slidable within the cylinder 32 and defines cylindrical compartments 34 and 35 with passive oil filling on each side thereof. The piston 43 has bypasses 36 and 37 which extend partly radially and partly axially and which are closed by respective disc valves under the urging of springs 40 and 41. A piston packing 42 prevents exchange of oil between the cylinder compartments 34 and 35 when the valves 38 and 39 are closed. The piston 33 and the piston rod 43 on the outlet side remain at rest when axial forces act on the piston rod 43 from the outlet side. The outlet piston rod 43 is secured in a sleeve member 45 which is screwed into the piston 43.

When an axial force acts on the piston rod 48 from the inlet side, one of the two valves 38 and 39 is opened by a sleeve 47 sliding within the piston 33 and screwed to a threaded journal 46 of the piston rod 48 on the inlet side. This opens bypass 36 or 37 and the piston can move axially along with the piston rod 43 of the outlet side. A small amount of axial play 44 is provided between the inlet piston rod 48 and the surrounding piston 43 effecting the opening of the valves 38 and 39. Such movement is small in a manner similar to the embodiment of the FIG. 2 flight control and therefore has no harmful effect. If inadmissibly high forces act on the outlet piston rod 43 which may cause damage to an articulated part, one or the other of the valves 38 or 39 is opened by the oil pressure acting on it so that the piston is again axially displaced and the reaction of the piston rod 48 on the inlet side is produced. By a suitable layout of the valves 38 and 39 and the valve springs 41 and 40, the reaction lock can be adapted to respective conditions.

While specific embodiments of the invention have been shown and described in detail to illustrate the application of the inventive principles, it will be understood that the invention may be embodied otherwise without departing from such principles.

What is claimed is:

1. A mechanical control such as a flight control for actuating an element to be controlled such as a rudder of an aircraft and similar device, comprising a plurality of controlling elements, means for mechanically connecting said controlling elements to the element to be controlled, and a control lock connected between said mechanically connecting means and one of said controlling elements including means permitting movement from said controlling element to said mechanical means but preventing a reaction movement from said mechanical means to said controlling element, said means for mechanically connecting said controlling elements to the element to be controlled including a double-armed lever centrally connected to the element to be controlled and connected at a spaced location from the center to respective controlling elements.

2. A mechanical control such as a flight control for actuating an element to be controlled such as a rudder of an aircraft and similar device, comprising a plurality of controlling elements, means for mechanically connecting said controlling elements to the element to be controlled, and a control lock connected between said mechanically connecting means and said controlling elements having means permitting movement from said controlling element to said mechanical means but preventing a reaction movement from said mechanical means to said controlling elements, said control lock including a hydraulic cylinder, an inlet piston rod slidable in said cylinder and extending through one end thereof, an outlet piston rod connected into said cylinder from the other end, a piston assembly connecting said inlet and outlet piston rod members within said cylinder in sealing engagement with the interior of said cylinder and preventing hydraulic flow to opposite sides of the piston in said cylinder, and valve and passage means defined in said piston for displacing fluid therethrough permitting movement of said piston when a force acts on a said inlet control rod to move it and for blocking passage of fluid therethrough and preventing displacement of said piston when a reaction force acts on said outlet piston rod.

3. A mechanical control according to claim 2, wherein said valve and passage means includes a passage defined within said piston means, a central wall dividing said passage into two compartments with an opening communicating therebetween, valve means closing said openings, said piston assembly including a portion of said inlet connecting rod which has axial play for permitting opening of said valve means.

4. A mechanical control such as a flight control for actuating an element to be controlled such as a rudder of an aircraft and similar device, comprising a plurality of controlling elements, a double-armed lever centrally connected to the element to be controlled and connected at a spaced location from the center to respective controlling elements, and a control lock connected between said mechanically connecting means and at least one of said controlling elements, having means permitting movement from the associated one of said controlling elements to said mechanical means but preventing a movement from said mechanical means to the associated one of said controlling elements.

References Cited by the Examiner
UNITED STATES PATENTS

| | | | |
|---|---|---|---|
| 1,608,042 | 11/1926 | Smith | 91—391 |
| 2,365,247 | 12/1944 | Carlton | 192—8 |
| 2,384,201 | 9/1945 | Simpson | 244—83 |
| 2,479,169 | 8/1949 | Kremiller | 192—8 |
| 2,952,424 | 9/1960 | Schurr. | |
| 3,046,945 | 7/1962 | Hayner | 244—78 X |

FOREIGN PATENTS 131,356    7/1918    Great Britain.

MILTON BUCHLER, *Primary Examiner.*

ANDREW H. FARRELL, *Examiner.*